United States Patent [19]

Belanger et al.

[11] Patent Number: 5,443,014
[45] Date of Patent: Aug. 22, 1995

[54] FLOOR MOUNTED ON DEMAND CONVEYOR

[75] Inventors: Michael J. Belanger, Walled Lake; Robert J. Wentworth, Farmington Hills; Barry S. Turner; Kenneth J. Dollhopf, both of Livonia, all of Mich.

[73] Assignee: Belanger, Inc., Northville, Mich.

[21] Appl. No.: 146,229

[22] Filed: Nov. 1, 1993

[51] Int. Cl.⁶ .......................................... B61B 13/00
[52] U.S. Cl. ........................ 104/172.3; 104/172.5; 198/718; 198/732
[58] Field of Search ............... 104/172.3, 172.5, 162; 198/718, 732, 735.5

[56] References Cited

U.S. PATENT DOCUMENTS

| | | | |
|---|---|---|---|
| Re. 30,026 | 6/1979 | Hanna et al. | 104/172.3 |
| 3,415,354 | 12/1968 | Benatar et al. | 198/732 |
| 3,526,193 | 9/1970 | Vani | 104/172.3 |
| 3,568,606 | 3/1971 | Grant | 104/172.3 |
| 3,662,690 | 5/1972 | Galloway et al. | 104/172.5 |
| 3,677,190 | 7/1972 | Koch | 104/172.3 |
| 3,719,151 | 3/1973 | Andersen | 104/172.3 |
| 3,744,433 | 7/1973 | Bernardi | 104/172.3 |
| 3,815,512 | 6/1974 | Balas | 104/172.3 |
| 3,832,953 | 9/1974 | Aaron | 104/162 |
| 3,861,324 | 1/1975 | Shelstad | 198/732 X |
| 3,971,325 | 7/1976 | Evans | 104/172.3 |
| 4,266,482 | 5/1981 | Barber | 104/172.3 |
| 4,374,496 | 2/1983 | Hanna | 104/172.3 |
| 4,553,713 | 11/1985 | Hecht et al. | 242/78.1 |
| 4,576,098 | 3/1986 | Belanger et al. | 104/172.3 |
| 4,864,936 | 9/1989 | Rietsch, Jr. | 104/172.3 X |
| 5,133,264 | 7/1992 | Belanger et al. | 104/172.3 |
| 5,140,910 | 8/1992 | Welter | 104/172.3 |
| 5,156,261 | 10/1992 | Dorner | 198/816 |
| 5,174,213 | 12/1992 | Belanger et al. | 104/172.3 |
| 5,228,392 | 7/1993 | Belanger et al. | 104/172.3 |

FOREIGN PATENT DOCUMENTS 2156370  5/1973  Germany .

OTHER PUBLICATIONS

Flapan 1084 catalog, circa 1984.

*Primary Examiner*—Robert J. Oberleitner
*Assistant Examiner*—S. Joseph Morano
*Attorney, Agent, or Firm*—Brooks & Kushman

[57] ABSTRACT

An above the floor conveyor is provided for transporting a wheeled vehicle having a plurality of tires across a floor surface with a pair of the vehicle's tires oriented in a guided track. The conveyor includes a drive and idle sprocket which are spaced apart and have an endless tensile member extending in a loop thereabout to define a drive and a return flight. A series of dolly assemblies are attached to the endless conveyor tensile member in spaced apart orientation. The dolly assemblies have an elongated dolly roller for engaging a tire of a vehicle located within the guided track. The dollies are pivotable about a generally vertical dolly axis between an inactive position in which the dolly roller is pivoted rearwardly out of the guided tracks and an active position in which a dolly roller extends inwardly into the guided track. The dolly assembly has an arm extending outwardly from the pivot axis providing a follower spaced from the axis. A dolly guide rail is fixed parallel to the drive flight for cooperating with the dolly follower to support the dolly when in the active position. An actuator is provided to selectively shift the dolly between the inactive and active positions on demand.

23 Claims, 8 Drawing Sheets

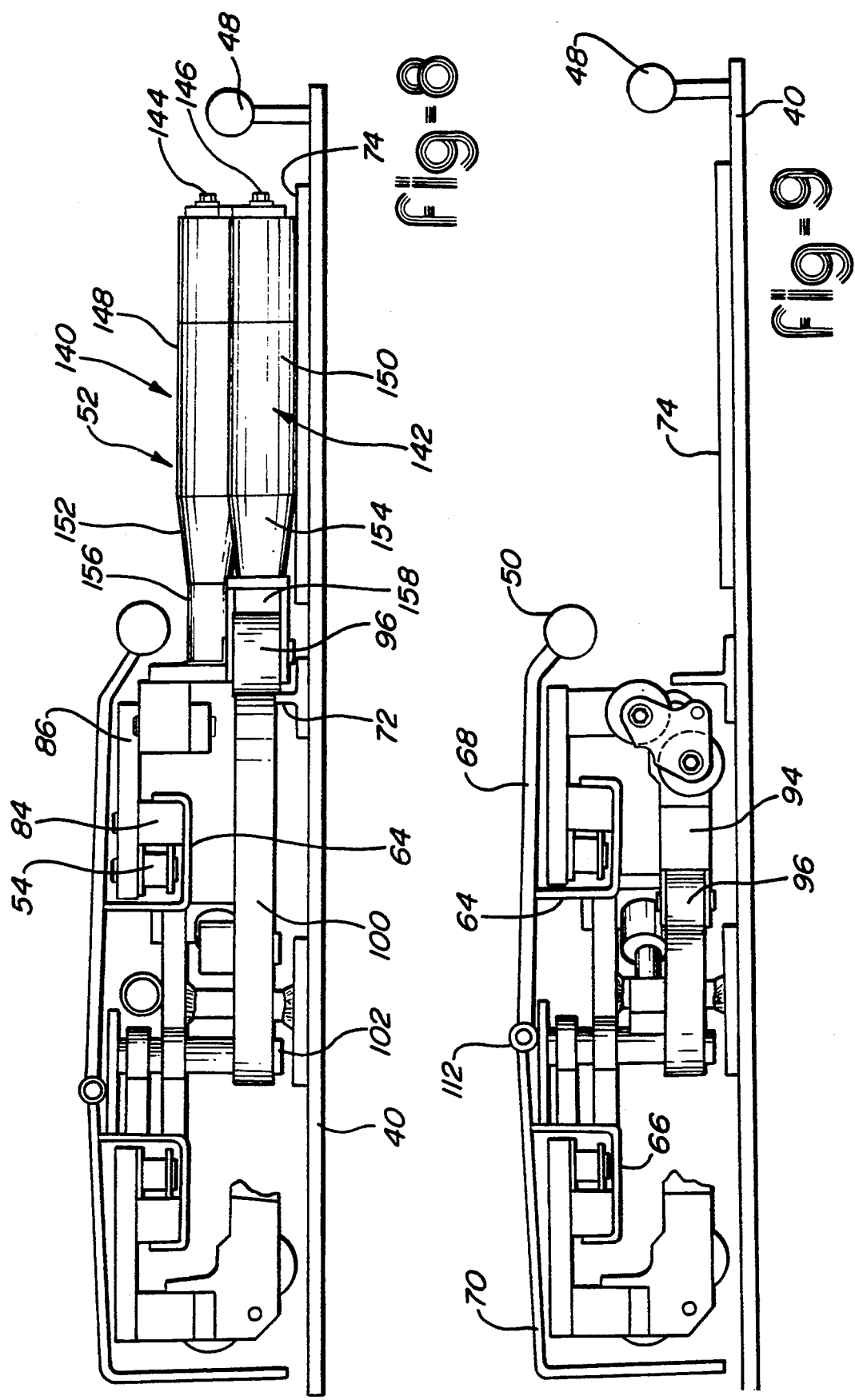

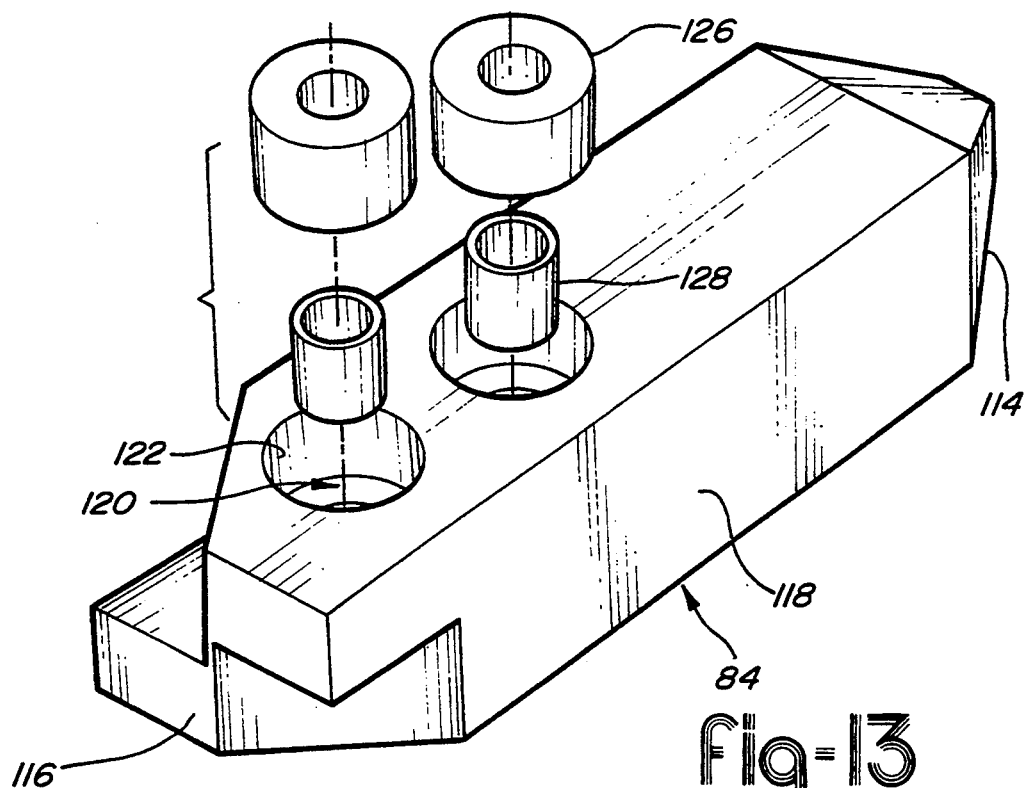
fig-13
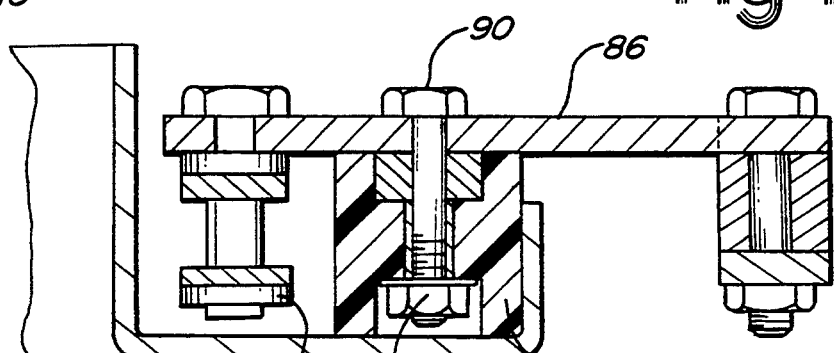
fig-12
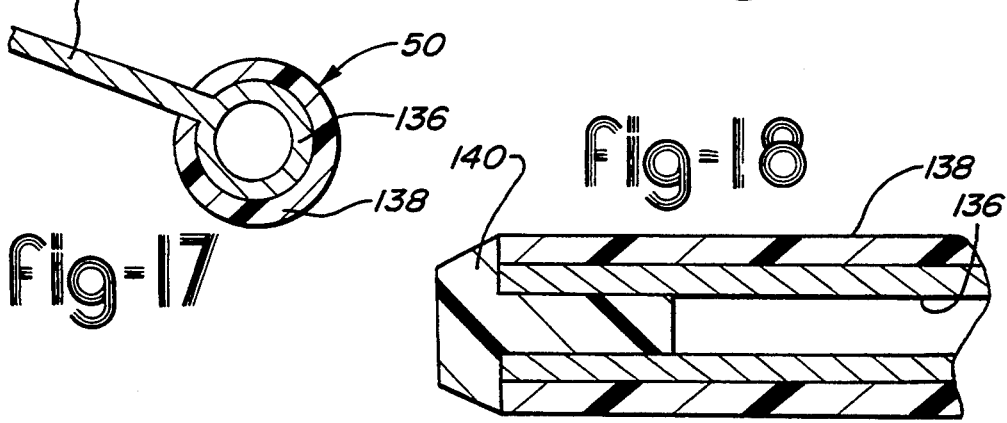
fig-17
fig-18

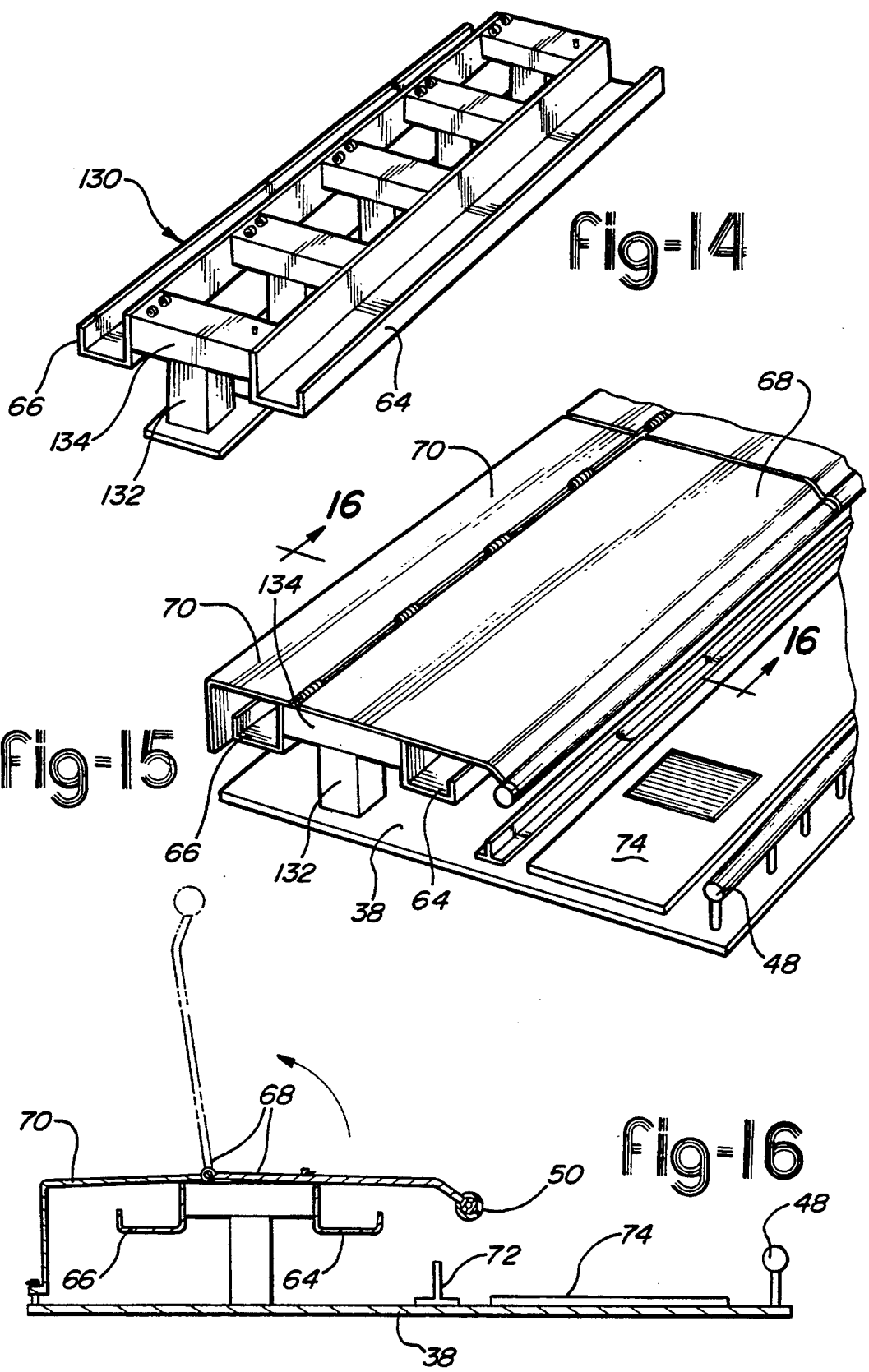

FLOOR MOUNTED ON DEMAND CONVEYOR

TECHNICAL FIELD

This invention relates to conveyors and, more particularly, to conveyors for use for translating vehicles across a horizontal floor surface particularly of the type frequently used in car washes.

BACKGROUND ART

Conveyors for vehicles such as automobiles or the like are utilized frequently in drive-through car washes as well as other applications in which it is desirable to slowly advance a vehicle across a horizontal floor surface. One of the most common type of conveyors utilized is the "in the floor" type such as that shown in U.S. Pat. No. 4,576,098, Belanger et al. A guided track extends along the floor surface and the conveyor mechanism is oriented in an elongated trench below the floor immediately under the guided track. On demand, a dolly will rise out of an opening at the entrance end of the conveyor for engaging the tire of a vehicle which has been properly staged in the conveyor. The dolly will gradually advance the vehicle along the conveyor until the vehicle exits and the dolly drops below floor level to begin its said return flight. It should be noted that dollies have two alternative paths on the drive flight, one path below floor level where the dolly is totally out of the way and an alternative path above floor level within the guided track for engaging the vehicle tire. Dollies can be spaced sufficiently close together so as to enable a series of automobiles being translated along the conveyor to be positioned relatively close apart to achieve maximum vehicle through put.

Below the floor conveyors are widely used in North America and function quite satisfactorily, however, they are expensive to install due to the required concrete work necessary to embed the conveyor below the floor surface. The necessity for concrete work not only adds expense and length of construction and installation time, it becomes difficult and expensive to return the building to its original state if the building is to be subsequently used for a different purpose.

In order to minimize some of the problems associated with below the floor conveyors there have been many efforts over the years to build a commercially feasible above the floor conveyor for use in car washes or the like. Examples of prior art above the floor conveyors are illustrated in the following patents: U.S. Pat. Nos. 3,196,806, 3,677,190, 3,719,151, 3,744,433, 3,815,512, 3,861,324. Most of the preceding patents are not truly above the floor conveyors since a substantial part of the conveyor drive mechanism or the dolly activation mechanism is oriented below floor level.

Recently, the assignee of the present invention developed a floor mounted automotive conveyor which solved many of the preceding problems. This conveyor is illustrated in U.S. Pat. Nos. 5,133,264 and 5,228,392, both of which are incorporated by reference herein. This conveyor may be installed upon a flat horizontal concrete surface without concrete work and is a true on demand conveyor system in which dollies can be activated only when necessary. While conveyors of this design solve many of the problems of the prior art conveyors, there remains a need to improve conveyor reliability and performance.

Typical prior art floor mounted conveyors merely minimize the amount of concrete work necessary, and cannot be installed upon a flat horizontal concrete surface unless a platform is used at least locally, to space the conveyor to floor. An exception to this general statement is U.S. Pat. No. 3,861,324 which has spaced the conveyor sufficiently above the floor as illustrated in FIG. 2, so as to enable the drive motor chain to pass beneath the platforms on which the vehicle tires ride. U.S. Pat. No. 3,744,433 also appears to be a truly above the floor conveyor of the "on demand" type. It should be noted that the "on demand" feature is achieved by removably connecting the dollies to the conveyor drive chain so that the dollies do not need to be transported along the drive flight of the conveyor in an inactive position. The mechanism required to remove and reinstall the dolly is relatively complicated adding to the cost and the complexity of the conveyor.

DISCLOSURE OF THE INVENTION

The object of the present invention is to provide a floor mounted conveyor which can be installed upon a flat, horizontal floor surface transporting automobiles there across at floor level.

Another object of the present invention is to provide a low cost, highly durable conveyor system that can call drive dollies on demand thereby enabling multiple vehicles to be positioned on the conveyor at any one time period.

Another object of the present invention is to provide a floor mounted conveyor which is relatively narrow in width, and sufficiently low in profile to enable the conveyor to be used in conjunction with conventional car wash equipment which must wash the sides of the vehicle.

Yet another object of the present invention is to provide a floor mounted vehicle conveyor in which the conveyor tensile member has a minimal wear and need for service.

Another object of the present invention is to provide a floor mounted vehicle conveyor having a cover which encloses the dollies at all times except when the dollies are in the active position of the drive flight.

Another object of the present invention is to provide a floor mounted vehicle conveyor having a durable rigid tire guide forming a boundary between the conveyer and the guided track for a vehicle tire which can be easily removed for conveyor service.

Accordingly, the conveyor of the present invention is provided for installation above a flat horizontal floor surface to transport a vehicle horizontally with a pair of the vehicle's tires oriented in a guided track. The conveyor includes a conveyor drive and idle sprocket rotatably oriented to one another in spaced apart relation supporting an endless conveyor tensile member extending in a loop thereabout to define a drive flight parallel to and laterally spaced from the guide track and a return flight adjacent thereto. A drive motor rotates the conveyor drive flight causing the drive flight to advance in a forward direction. A series of dolly assemblies are attached to the conveyor tensile member in spaced apart orientation. The dolly assemblies are provided with an elongated dolly roller for engaging the tire of the vehicle. The dollies assemblies are pivotably attached to the conveyor tensile member and are shiftable by the vertical pivot axis between an inactive position in which the dolly roller is pivoted rearwardly out of the guided tracks and an active position in which the dolly roller extends inwardly into the guided track for engagement with a vehicle tire. The dolly assembly is further provided with an arm having a follower spaced outwardly from the dolly pivot axis. A dolly guide rail is fixed parallel to the drive flight for slidably cooperating with the dolly arm follower to support the dolly when in the active position. An actuator is located adjacent to the forwardmost end of the guide rail for selectively shifting the dollies between the active and inactive positions on demand.

BRIEF DESCRIPTION OF THE DRAWINGS

FIGS. 8–9 are cross-sectional longitudinal views showing the dolly orientation in the extended and retracted positions;

FIG. 12 is an enlarged cross-sectional end view showing the orientation of the glide block chain and drive flight channel;

FIG. 13 is an enlarged exploded perspective view of a glide block assembly;

FIG. 14 is a perspective view of a portion of the frame assembly;

FIG. 15 is an enlarged perspective view illustrating the conveyor drive flight and return flight covers;

FIG. 16 is a cross-sectional end view illustrating the conveyor drive flight and return flight covers;

FIG. 17 is an enlarged cross-sectional view of a portion of the drive flight cover and the outer tire guide; and FIG. 18 is an enlarged cross-sectional side elevation of the outer tire guide.

BEST MODES FOR CARRYING OUT THE INVENTION

Figure 1:
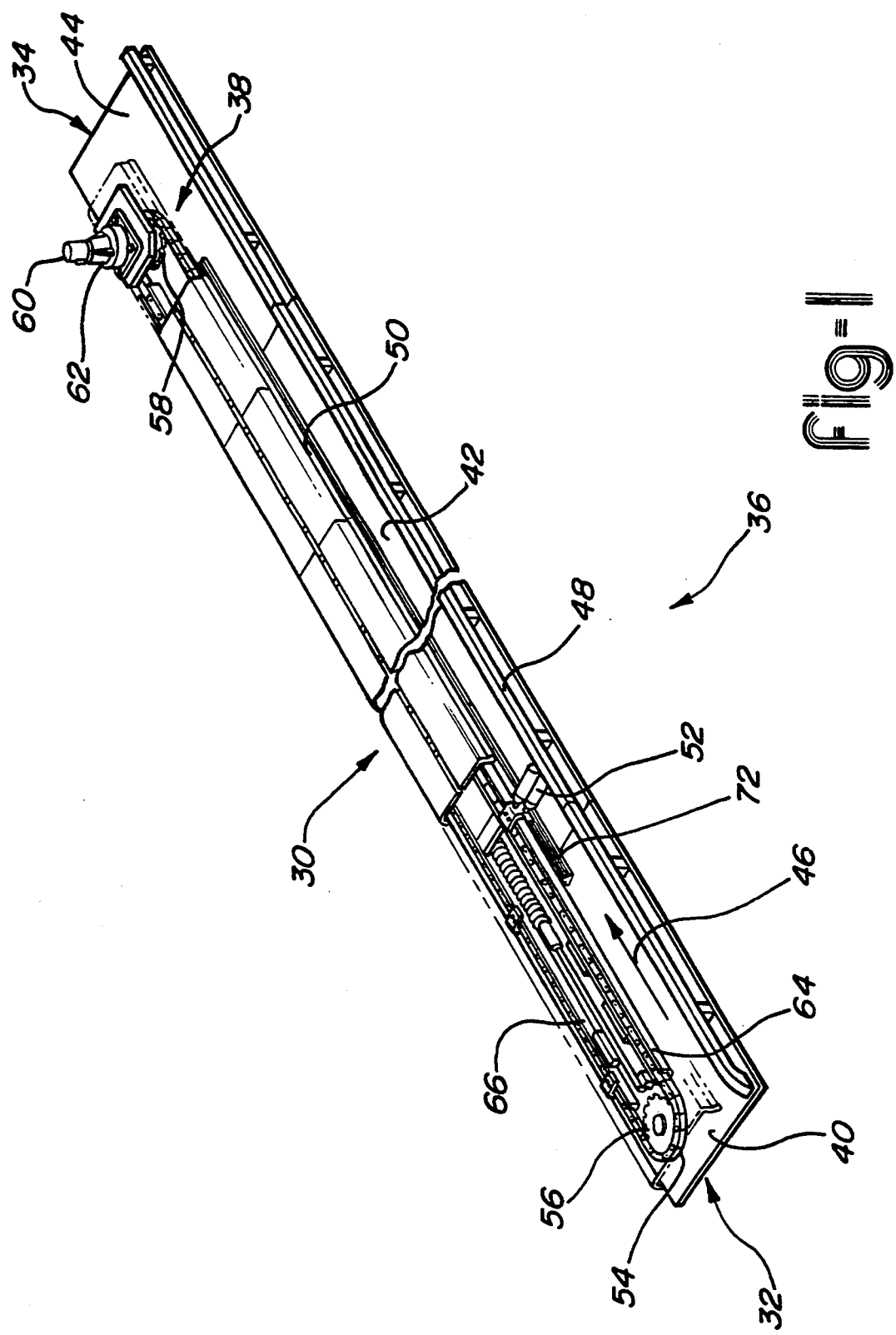
FIG. 1 is a perspective view of the conveyor with the center section broken away and the covers removed from the two conveyor end portions.

A floor mounted automobile conveyor 30 is illustrated in a perspective view in FIG. 1 with a portion of the conveyor covers at the entrance end 32 and the exit end 34 shown in phantom outline so as to better illustrate the conveyor mechanism. Additionally, the center section of the conveyor is removed for illustration purposes as indicated by the fragmentary lines. It should be appreciated that the conveyors of the present design can be fabricated in a variety of lengths in order to suit the particular application requirements. Conveyor 30 is installed directly upon a generally flat horizontal floor surface. Conveyor 30 is provided with a base plate 38 made up of three or more sections; entrance section 40, intermediate section 42 and an exit section 44. Preferably, base plate 38 defines at least in part a guided track 46 for one pair of the vehicle's wheels to translate in as the vehicle is conveyed along the length of the conveyor. In the preferred embodiment, the base plate sections form a floor of the guide track with the inboard movement of the vehicle's tires constrained by an inboard tire guide 48 and an outboard tire guide 50.

A vehicle is moved along the conveyor by a dolly assembly 52 which translates along the guided track and engages a wheel of the vehicle. The dolly assembly 52 is pivotably affixed to chain 54 which forms an endless loop about idle sprocket 56 and drive sprocket 58. Of course, other flexible tensile members such as a cable or the like could be used as an alternative to a chain, with drive and idle sprockets 56 and 58 modified accordingly. The chain is advanced in the direction of forward dolly movement by drive motor 60 which is coupled to drive sprocket 58 via a planetary gear drive mechanism of conventional design providing approximately a 4:1 reduction. Motor 60 is preferably a hydraulic motor which is operated by a remotely located hydraulic pump in a typical manner.

The elongated loop of the chain 54 forms a forwardly advancing chain drive flight immediately adjacent the guided track and a return flight positioned outboard therefrom. The loop of the chain 54 lies in a plane generally parallel to and spaced above the base plate 38 and floor surface 36. The chain drive flight is supported by drive flight chain channel 64, while the chain return flight is supported by return flight chain channel 66.

In a normal operation, the dollies will always be traveling beneath drive flight covers and return flight covers 68 and 70, respectively, unless the dolly in the drive flight is called to the active position. When the dolly is called to the active position, as illustrated in FIG. 1, the next dolly rounding the idle sprocket will be pivoted outwardly into the guided track about a generally vertically aligned pivot axis. The dolly, once in the active position, will be maintained in the active position by guide rail 72. Guide rail 72 is affixed to base plate 38 and extends throughout the portion of the drive flight in which the dolly will be actively engaging the vehicle tire.

Figure 2:
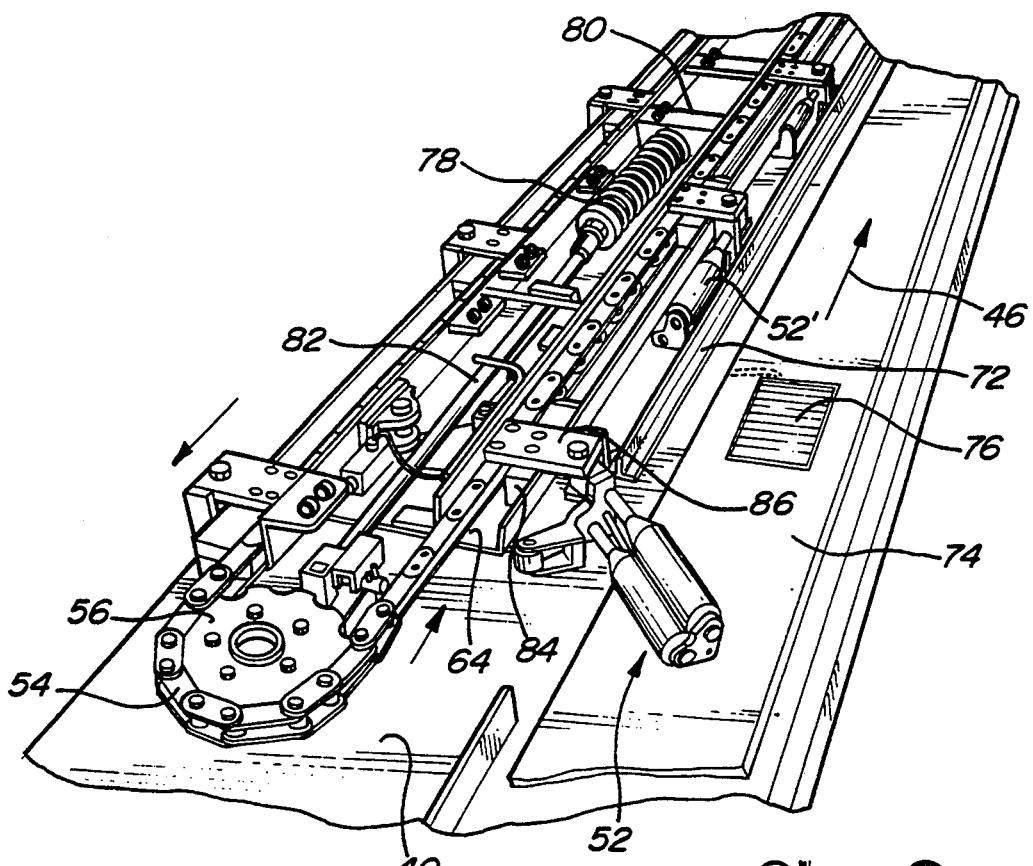
FIG. 2 is a perspective view of the conveyor entrance and with the covers removed.

The entrance end of the conveyor can be seen in better detail in FIG. 2. Base plate entrance section 40 is a heavy steel plate. A track plate 74 is affixed to the base plate in the local region of guided track 46. When the dolly assembly 52 is positioned in the active position, the dolly assembly rolls upon track plate 74. When dolly assembly 52 is in the inactive position as shown by dolly 52' in FIG. 2, the dolly assembly is spaced above the base plate by the thickness of track plate 74, thereby preventing dolly wear. Track plate 74 also serves to locate pressure path 76 which is used to sense the location of a vehicle tire.

The chain is maintained tight by tension spring 78. Spring 78 abuts frame rail 80 at one end and tension rod 82 at the other. Tension rod 82 elastically biases idle sprocket 56 away from the drive sprocket maintaining the flights of the chain taut and automatically compensating for any elongation in the chain due to wear.

Figure 3:
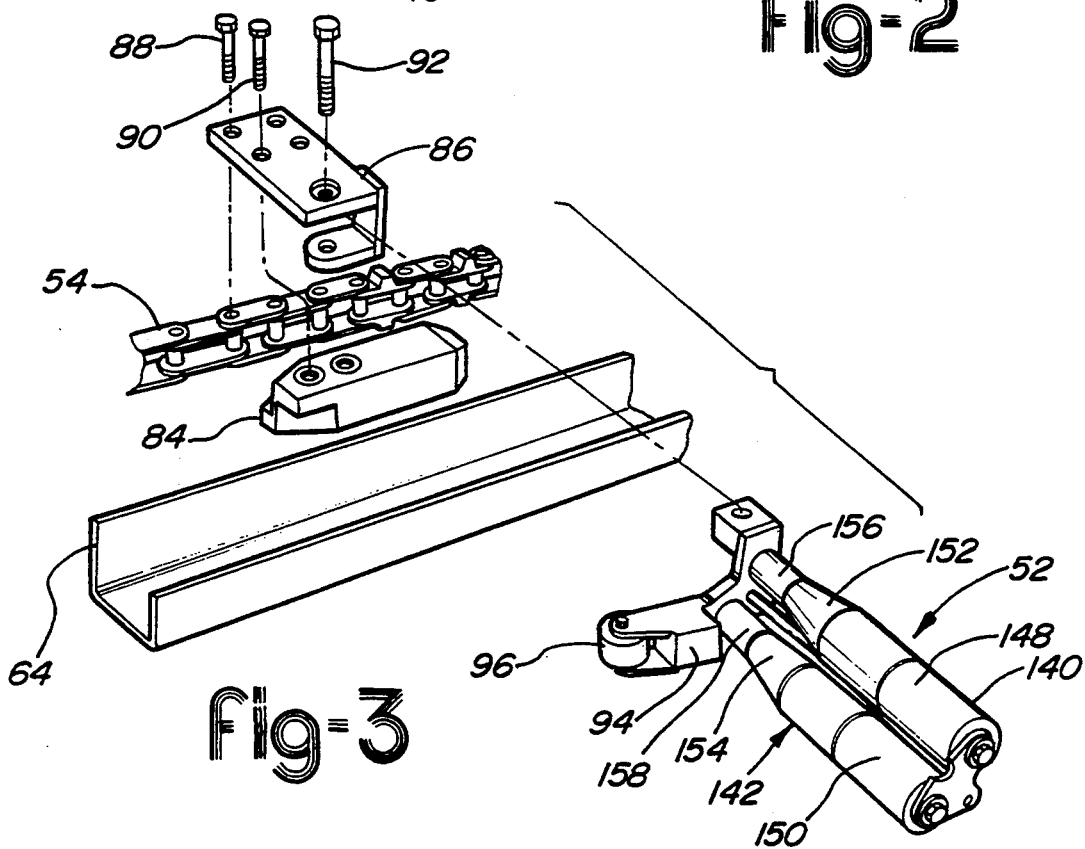
FIG. 3 is an exploded perspective view showing a dolly assembly, the drive flight channel and the drive chain.

The orientation of the chain drive flight relative to drive flight chain channel 64 is illustrated in FIGS. 2 or 3. Drive flight chain channel is generally U-shaped in cross-section and extends longitudinally throughout the center span of the chain drive flight. Affixed to the chain at each dolly attachment location is a glide block 84. The chain is affixed to the glide block via glide block bracket 86. The glide block 84 is oriented within the drive flight channel 64 and supports the chain 54 freely above the drive flight channel. This assembly is shown in exploded view in FIG. 3. Chain 54 is affixed to glide block bracket 86 by chain attachment bolts 88. The glide block bracket is affixed to the glide block 84 by attachment bolts 90. Dolly assembly 54 is pivotably affixed to the glide block bracket 86 by pivot bolt 92 which is generally perpendicularly aligned relative to the floor surface. Dolly assembly 52 is provided with a rearwardly extending arm 94 which trails behind the dolly assembly when oriented perpendicular to the chain when the dolly is in the active position. Arm 94 is preferably provided with a roller 96 designed to engage guide rail 72. Arm 94 and roller 96 are located below the level of drive flight channel 64 so that the arm extends beneath the drive flight channel and above the base plate when the dolly is in the inactive position.

Figure 4:
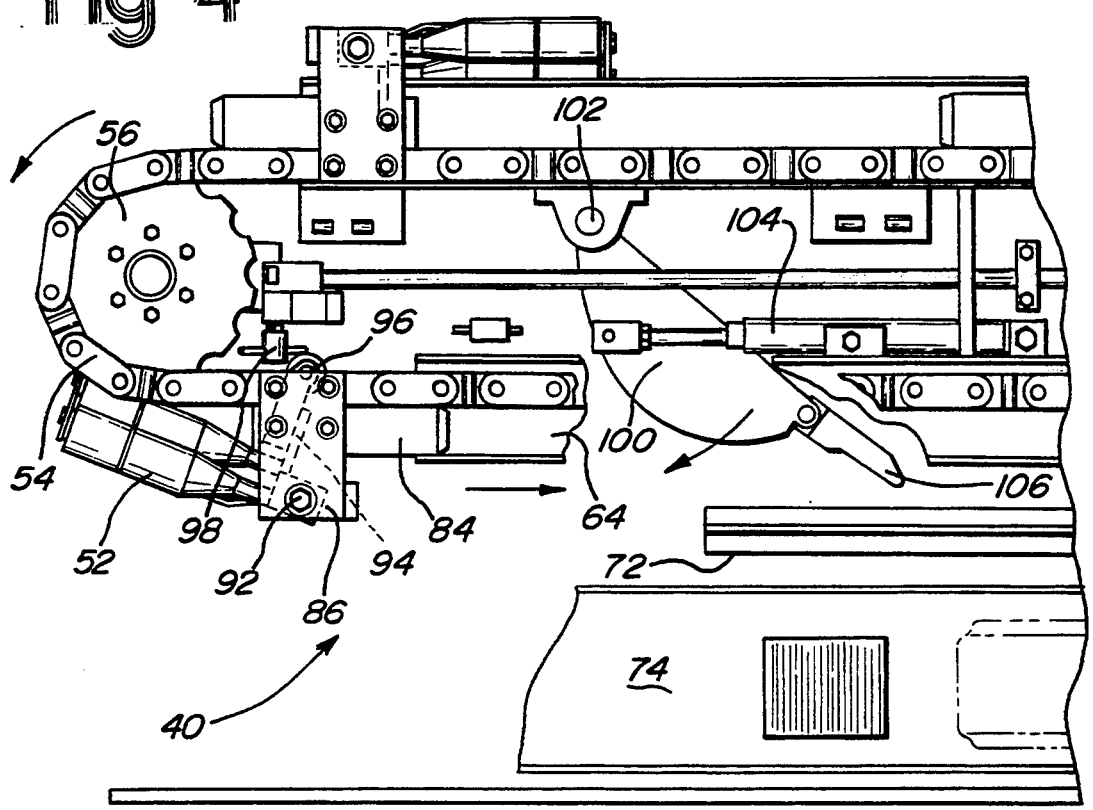
FIGS. 4–6 are a series of illustrations of the conveyor entrance end showing an active dolly at various positions.
Figure 5:
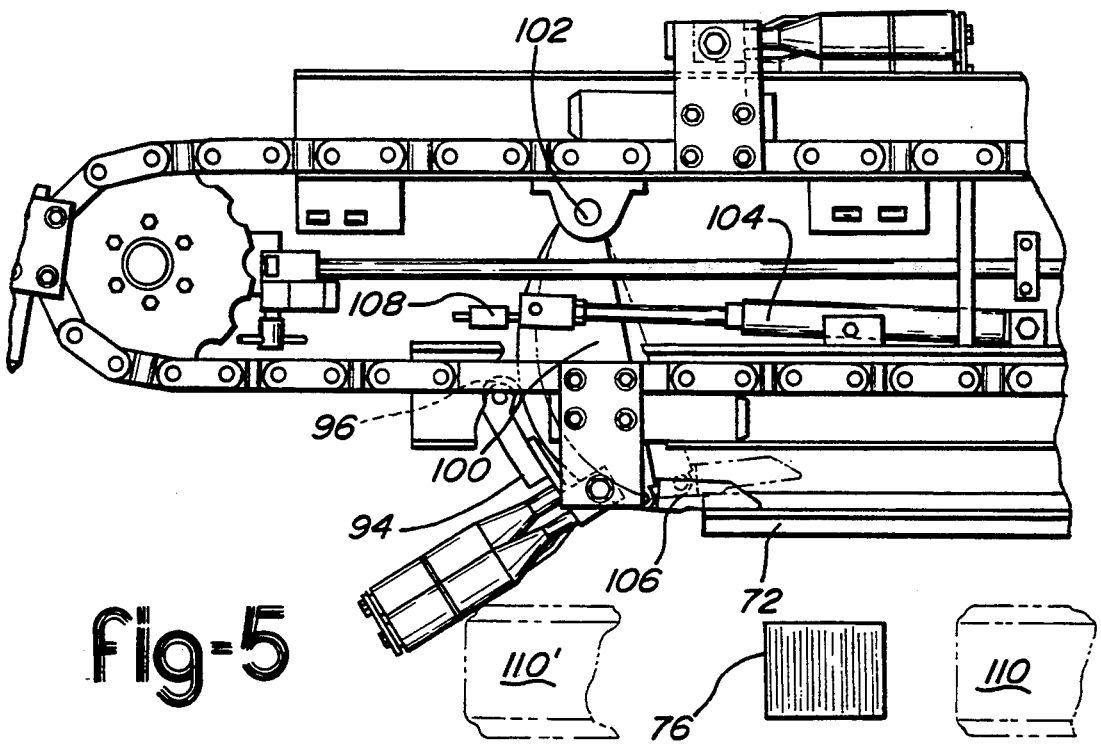
Figure 6:
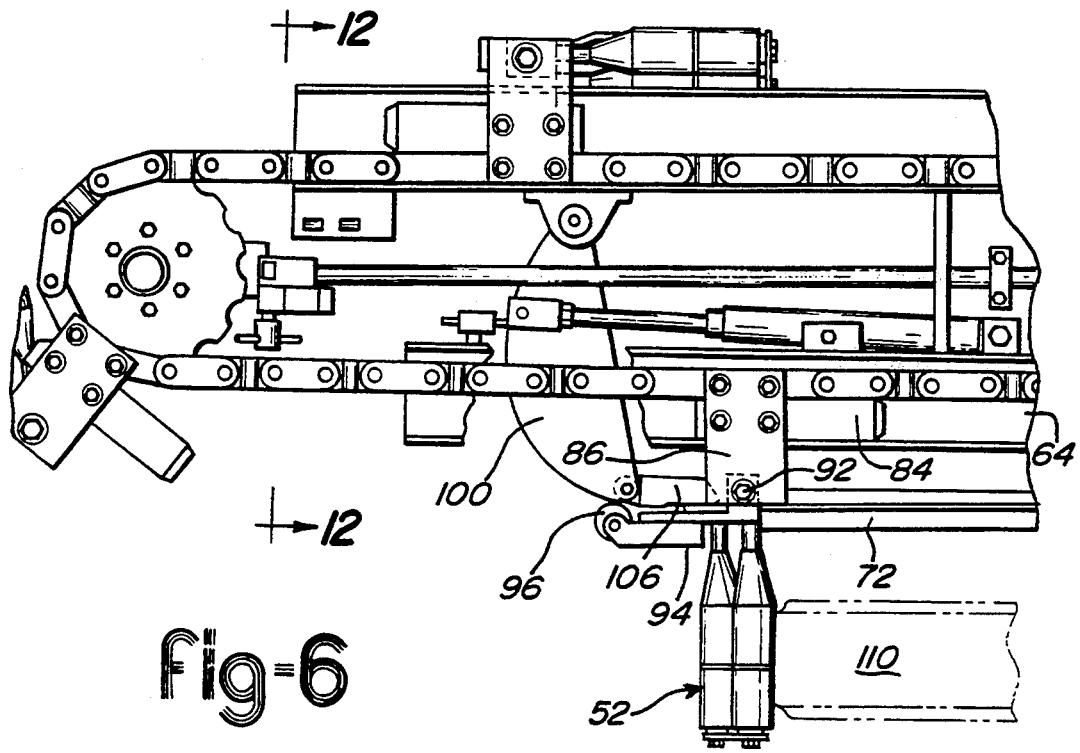

With reference to FIGS. 4–6, the entrance end of the conveyor is illustrated in plan view showing dolly assembly 52 at three sequential orientations as the dolly 52 rounds idle sprocket 56 and is shifted to the active dolly 52' position. In FIG. 4, dolly 52 has just rounded idle spot 56 and is advancing in the forward direction. Dolly assembly 52 is pivotably attached to glide block bracket 86 and extends generally rearwardly from pivot bolt 92 as illustrated. Glide block bracket 86 is positioned on the straight section of the chain 54 drive flight enabling glide block 84 to lie parallel to the chain and engage drive flight channel 62. As illustrated, the forward most end of the glide block 84 is tapered to ease the glide block's engagement with the drive flight channel.

When the dolly 52 is in the retracted position, as shown in FIG. 4, arm 94 (shown in phantom outline) extends beneath chain 54 enabling roller 96 to engage limit switch 98 which provides a signal to the conveyor control system that a dolly has just rounded idle sprocket 56. If it is not desired to activate the dolly, then the dolly continues to advance in this trailing orientation illustrated out of the guided track. If, however, it is desirable to activate the dolly, then cam 100 is rotated about its fixed pivot 102 by pneumatic cylinder 104. Cam 100 is provided is with a hinged cam extension 106 on the end of the cam opposite pivot 102 so that the width of the cam in the retracted position can be minimized. As the cam moves to the fully extended position illustrated in FIG. 5, the cam extension 106 engages guide rail 72 and cam 100 contacts limit switch 108. As the chain and dolly assembly advance, roller 96 on end of arm 94 engages the arcuate surface of cam 100. This causes the dolly assembly to pivot counter-clockwise about pivot bolt 92 until the dolly reaches an orientation perpendicular to the chain drive flight as illustrated in FIG. 6. The dolly will normally engage the vehicle tire 110 shown in the normal tire staging orientation.

If the driver of the vehicle does not properly position the car or backs up after the dolly is called for, there is a possibility of damaging a tire or wheel rim as the dolly is actuated. In order to prevent this damage from occurring, the dolly may be automatically retracted if a tire is impacted by the dolly prematurely. With reference to FIG. 5, a tire 110' is illustrated in an improper position which could result in tire damage if the dolly was activated. As the dolly engages tire 110', a load will be exerted on the dolly assembly in the clockwise direction as a reaction to striking the tire, this load will be transferred by roller 96 to cam 100, the pneumatic pressure within cylinder 104 selected that exertion of excess pressure on the cam by roller 96 caused by engaging a tire will cause the cam to retract slightly as illustrated in phantom outline in FIG. 5. This slight movement of the cam is sensed by limit switch 108 which immediately causes the cam 100 to be retracted by pneumatic cylinder 104. Once the cam is retracted, dolly assembly 52 returns to the inactive position and passes by the tire without damage.

There is a limited region between the position of tire 110 and 110' illustrated in FIG. 5 where the dolly will not have adequate time to retract and could possibly hang up on guide rail 72. In that region, tire pressure pad 76 is positioned. If a tire is positioned over pressure pad 76, the dolly control system will not allow a dolly to be actuated.

Figure 7:
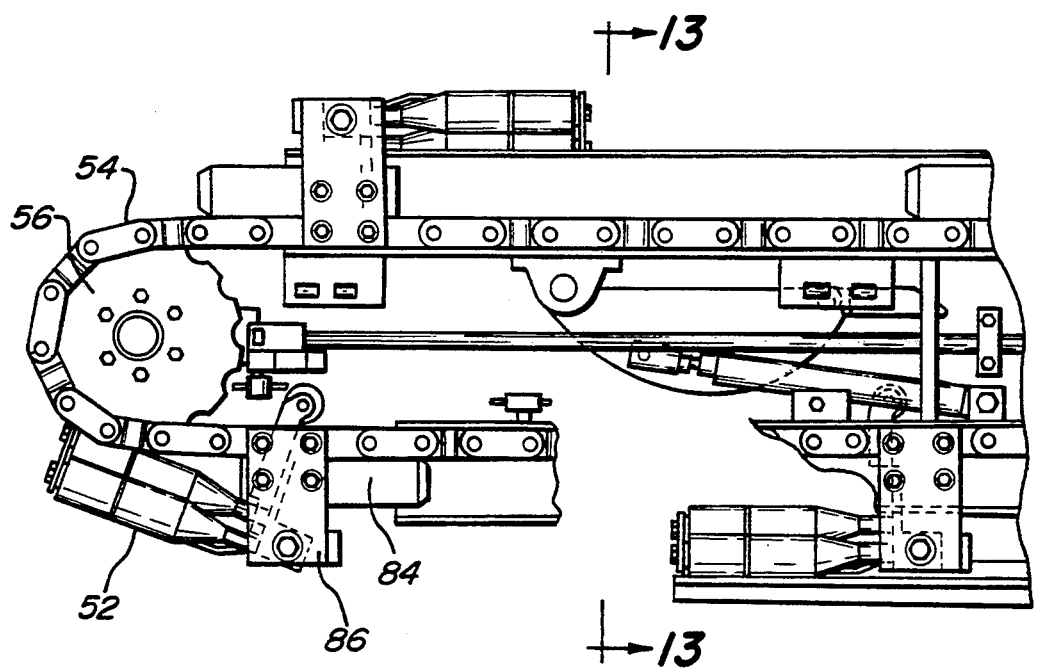
FIG. 7 illustrates the conveyor entrance end with the dolly in the inactive position.

As illustrated in FIG. 6, once dolly 52 is shifted to the active position, continued advancement of the dolly causes roller 96 to translate across cam extension 106 to engage guide rail 72. From that point forward, the dolly assembly is securely maintained in the active position and is incapable of retracting. The load exerted on dolly assembly 52 by tire 110 causes roller 96 to bear inwardly on guide rail 74 and to pull rearwardly and outwardly on pivot bolt 92 which attaches dolly assembly 52 to glide block bracket 86. The load exerted on glide block bracket 86 via the pivot bolt, is transmitted to the drive flight channel 64 by the glide block 84. As illustrated in FIG. 7, when cam 100 is not activated, dolly 52 passes by the cam and continues on its advancement adjacent to the conveyor guided track in the retracted position illustrated.

The relative height orientation of cam 100 relative to roller 96, base plate entrance section 40 and drive flight channel 64 is illustrated in FIGS. 8 and 9. In FIG. 8, cam 100 is extended causing dolly 52 to be shifted to the active orientation. One end of cam 100 cooperates with cam pivot 102 while the opposite end of the cam is tangent with guide rail 72 in order to transfer roller 96 smoothly on to the guide rail. As illustrated, cam 100 operates on a plane interposed between the base plate in section 40 and drive flight channel 64.

When the cam 100 is in the retracted position, as shown in FIG. 9, dolly 52 is inactive. Arm 94 and roller 96 extend outwardly beneath drive flight channel 64. With cam 100 retracted, roller 96 can pass freely by the cam with the dolly completely retracted out of the guided path. The return flight channel 66 is parallel to and spaced outboard of drive flight chain channel 64. The dolly on the return path is always retracted in order to minimize the overall width of the conveyor.

The orientation of the drive flight cover 68 and the return flight cover 70 are also clearly shown with reference to FIGS. 8 and 9. Outboard tire guide 50 is integrally formed as part of the drive flight cover. Drive flight cover is centrally pivoted along hinge 112 and cantilveredly extends over the chain in the inactive dolly path supported only by hinge 112 and drive flight chain channel 64. Drive flight cover 68 is formed of a heavy steel plate in order to provide adequate structure and weight to prevent the cover from being damaged or lifted in the event a vehicle rides up over the outboard tire guide 50. The return flight, cover 70 is of a similar design, however, since is it not necessary to have the dolly extend outward on the return flight, the cover can be supported upon the base plate by a series of leveler bolts which are not shown.

In FIGS. 8 and 9, the orientation of the dolly 52 in the active and inactive positions is shown relative to the base plate and section 40. In the active position, dolly assembly 52 rolls along track plate 74. When in the inactive position shown in FIG. 9, the dolly rollers are spaced above the base plate entrance section of 40 so as to prevent any unnecessary roller wear when the dollies are not in actual use. Similarly, the orientation of chain 54 relative to the drive flight and return flight channels 64 and 66, are illustrated clearly in FIGS. 8 and 9. The chain is suspended from the glide block brackets 86 so as not to rub on drive flight 64 or return flight 66 channels. It should also be noted that the glide block 86 only needs to engage drive flight channel 64 on its lower side and inside surface. The lower surface of the glide block must carry the weight of the chain and dollies while the inside surface must bear the reaction force caused by the dollies when engaging the tire in the active position.

Figure 10:
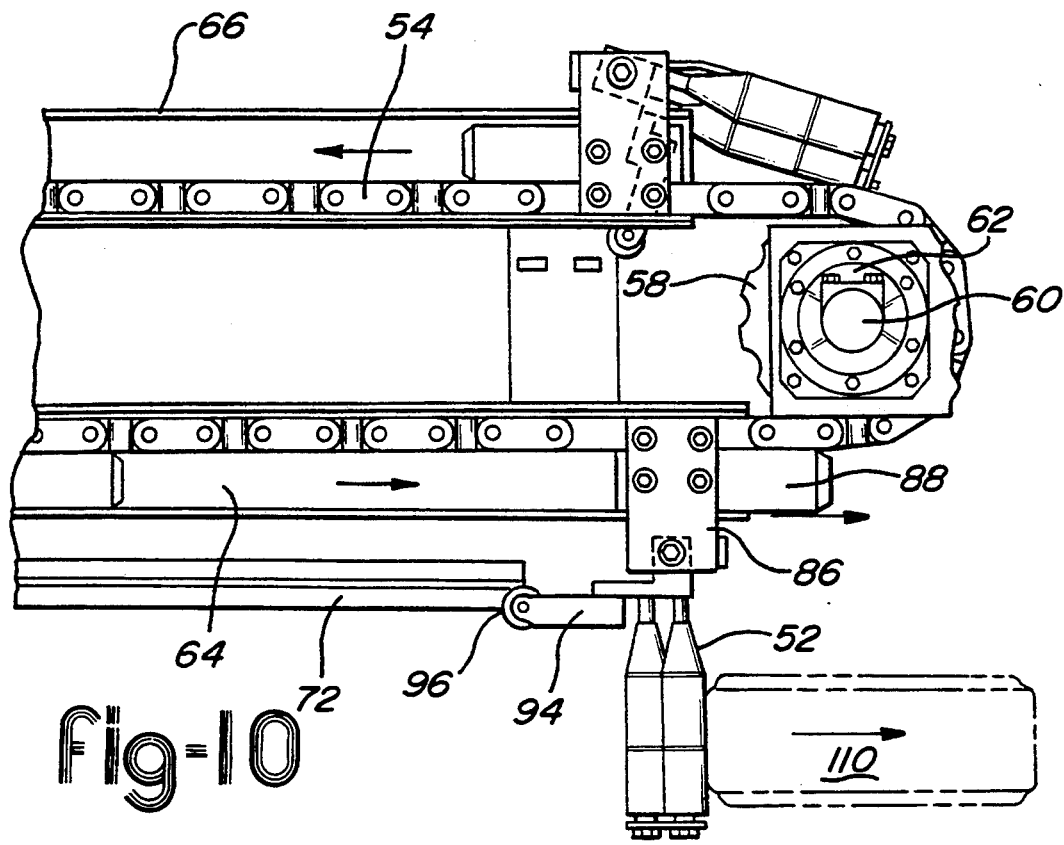
FIGS. 10–11 are plan views of the exit end of the conveyor showing the dolly positioned at various times.
Figure 11:
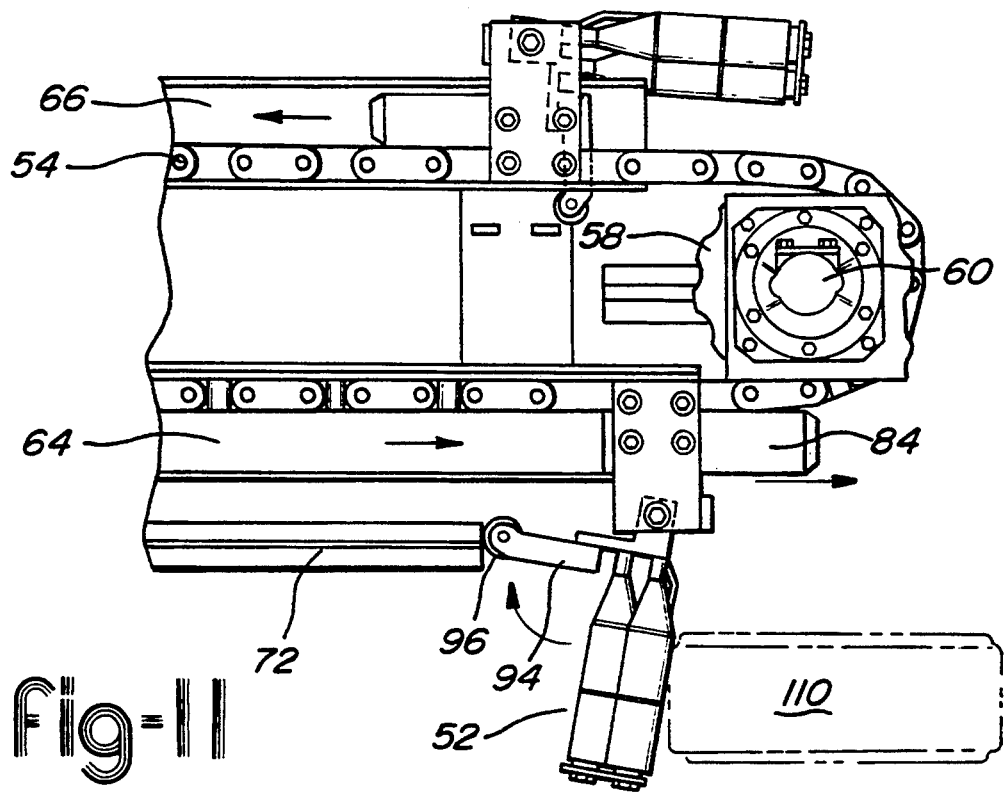

Once the dolly assembly gets to the exit end of the conveyor, it is necessary to retract the dolly so as not to push or scrape the tire with the end of the dolly as the dolly rounds drive sprocket 56. As illustrated in FIG. 10, roller 96 is reaching the end of guide rail 72. Continued advancement of the chain as shown in FIG. 11, causes the roller to drop off of guide rail 72 allowing the dolly to rotate clockwise to the retracted position.

The structure of glide block 84 is further illustrated in FIGS. 12 and 13. FIG. 12 is an enlarged cross-sectional end view of drive flight channel 64 cutting through glide block 84 and glide block bracket 86. The orientation of the glide block and chain 54 relative to glide block channel is shown in greater detail. During normal use, glide block 84 wears along its lower surface and inboard surface where it engages drive flight channel 64. Glide block 84 is made up of an elongated body having a tapered forward end 114, a rearward end 116 and a central region 118 oriented therebetween. The glide block elongated body has a generally uniform rectangularly cross-section having a flat top and bottom and a pair of flat spaced apart side walls which are sized to cooperate with the drive flight return flight channels.

In a preferred embodiment, a pair of vertically extending holes 120 extend through the elongated body of a glide block 84. Each end of the holes are preferably provided with an enlarged counter bore region 122. This design enables the nut 124 of glide block bolt 90 to be recessed above the surface of drive flight channel 64 by counter boring both ends of hole 120, the glide block is capable of being flipped over when the underside is worn and reused. Spacer 126 and sleeve 128 serve to securely clamp the glide block to the glide block bracket even when a glide block has been worn and flipped over. Spacer 126 will serve to maintain the glide block holes perpendicular to glide block bracket 186 in spite of any wear in the top surface.

The glide block as illustrated in FIG. 13 is provided with a notch on the inboard rear lower corner and outboard rear upper corner. This notch serves to provide clearance between the glide block and the dolly assembly when the dolly assembly is fully retracted. Preferably, the glide block is formed of conventional ultra high molecular weight polyethylene or similar dense plastic having good lubricity and wear characteristics. Spacer 126 and sleeve 128 are formed of aluminum or corrosion resistant material which was typically used in car washes. Glide blocks of this design have proven to be highly durable and reliable. The glide block length in the 8" to 12" range is sufficient to uniformly distribute the reaction force which is transmitted from the dolly to the drive flight channel via the glide block. Furthermore, by making the glide block a mere image of itself along a horizontal central plane, the glide block can be inverted when worn and used again.

The structure of the conveyor cover and supporting frame is shown in FIGS. 14–18. Frame section 130 includes drive and return flight chain channels 164 and 166. The chain channels are supported above the base plate by a series of vertical uprights 132 and horizontal cross members 134 which extend between the drive return flight chain channels 64 and 66. The frame assemblies are mounted to the various base plate sections in a longitudinal alignment as previously described. Drive flight cover 68 and return flight cover 70 are pivotably attached to the frame cross member 134 by a hinge 112. In FIG. 16, the cover is shown in its normal lowered position and in its raised position illustrated in phantom outline.

The cover 68 is made up of a series of longitudinally spaced apart panels. Each of the panels are pivotably attached to the frame as illustrated and are shiftable between a cantilveredly extending inward position over the conveyor drive flight and a service position pivoted upward to expose the drive flight. The drive flight covers 68 have an inward edge which are provided with an elongated tire guide 50. Each of the tire guide are generally coaxially aligned and cooperate with the tires of the vehicle to define an outer boundary of the guided track.

As illustrated in FIGS. 17 and 18, outboard tire guide 50 is made up of a steel tube 136 which is welded to drive flight cover 68 and a protective plastic sleeve 138 which surrounds the steel tube to minimize scratching or damage to the vehicle passing thereby. The ends of the tire guide tube segments are provided with end plugs 140 as illustrated in FIG. 18. These end plugs are preferably slightly tapered as illustrated to minimize the likelihood of the portion of the vehicle catching on the end of the tire guide segment. End plugs 140 and plastic sleeve 136 are preferably formed of a high density plastic material having good wear and elasticity characteristics such as polyethylene and the like.

Dolly assembly 52 is provided with a series of replaceable plastic rollers which are similarly formed of an ultra high molecular weight polyurethane or other suitable high density plastic having good wear characteristics. Dolly assembly 52 is shown previously and is best illustrated in FIGS. 3 and 8. The dolly assembly includes a pair of replaceable elongated dolly rollers; upper dolly roller assembly 140 which engages the tire of the vehicle and a lower dolly roller assembly 142, which rides along track 74. Each dolly roller assembly comprises an elongated body which is generally symmetrical by a central axis. The roller elongated body is provided with a central bore so that the roller can be free to rotatably cooperate with dolly axles 144 and 146.

The dolly roller assemblies are provided with a large generally uniform diameter section 148 and 150 and a generally frusto conical shaped section 152 and 154. The frusto conical sections each have a large diameter and adjacent to and matching the diameter of large diameter sections 148 and 150 and a small end axially spaced therefrom so that the small end is aligned in the direction of dolly travel when the dolly is in the inactive position. This design minimizes the likelihood of conveyor jamming. In the preferred embodiment of the invention illustrated, the dolly roller assemblies each further include a small diameter cylindrical section 156. Preferably, each of the sections, the large sections 148 and 150, the frusto conical sections 152 and 154; and the small cylindrical sections 156 and 158 are each discreet elements mounted on axles 146 and 148 to facilitate their independent replacement in the event of wear or damage.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A conveyor for translating a wheeled vehicle having a plurality of tires across a floor with a pair of the vehicle's tires oriented in a guided track, the conveyor comprising:
   a conveyor drive sprocket and a conveyor idle sprocket each rotatably oriented relative to the floor surface in spaced apart relation;
   an endless conveyor tensile member extending in a loop about the conveyor drive and idle sprockets defining a drive flight parallel to and laterally spaced from the guided track and a return flight spaced parallel to the drive flight;
   a drive motor for rotating the conveyor drive sprocket causing the drive flight to advance in a forward direction;
   a dolly assembly having an elongated dolly roller for engaging a tire of a vehicle located within the guided track, said dolly assembly being pivotally attached to the endless conveyor tensile member and shiftable about a generally vertical dolly pivot axis between an inactive position above the floor surface in which the dolly roller is pivoted rearwardly out of the guided track sufficiently to provide clearance for the vehicle and an active position in which the elongated dolly roller extends inwardly into the guided track to engage a vehicle tire, said dolly assembly provided with a follower portion spaced from said dolly pivot axis;
   an elongated dolly guide rail affixed parallel to the drive flight, said dolly guide rail having a first end located downstream of the idle sprocket and a second end located forward of the drive sprocket; said guide rail cooperating with the dolly follower to support the dolly assembly in the active position; and
   an actuator for selectively shifting the dolly between the active and inactive positions on demand;
   wherein said endless conveyor tensile member extends in a loop spaced above the floor a sufficient distance to enable the dolly follower to extend between the conveyor drive flight and the floor when the dolly is oriented in the inactive position.

2. The conveyor of claim 1 further comprising a base plate mounted upon the floor and a conveyor frame affixed to the base plate and supporting the endless conveyor tensile member thereabove.

3. The conveyor of claim 1 wherein said actuator comprises a cam shiftable within a plane located between the floor and the loop formed by the endless conveyor tensile member, in general alignment with the dolly follower.

4. The conveyor of claim 3 wherein said actuator further comprises a fluid powered cylinder cooperating with the cam to shift the cam between an active dolly and an inactive dolly position and means for sensing an excessive load exerted on the cam as a result of a jammed dolly to cause the fluid powered cylinder to automatically retract the cam to the inactive dolly position.

5. The conveyor of claim 3 wherein said cam is pivotably shiftable about a stationary pivot and provided with a free end spaced therefrom; said conveyor further comprising a cam extension member pivotably attached to the cam free end; said cam extension member being generally aligned with the guide rail when the cam is in the active dolly position and generally aligned with the cam when the cam is in the inactive dolly position to enable the cam to retract outwardly providing clearance for the dolly follower.

6. The conveyor of claim 4 further comprising a pressure sensitive pad oriented in the guided track to sense the presence of a vehicle's tire to prevent the actuator from selectively shifting the dolly to the active position when the tire is in a location which would result in a conveyor jam.

7. The conveyor of claim 2 further comprising an elongated guide flight channel affixed to the frame and spaced above the base plate for supporting the drive flight of the endless conveyor tensile member within the channel with the upper portion of the endless tensile conveyor member being exposed to facilitate the attachment of the dolly assembly thereto.

8. A conveyor for translating a wheeled vehicle having a plurality of tires across a floor with a pair of the vehicle's tires oriented in a guided track, the conveyor comprising:
   a conveyor drive sprocket and a conveyor idle sprocket each rotatably oriented relative to the floor surface in spaced apart relation;
   an endless conveyor tensile member extending in a loop about the conveyor drive and idle sprockets defining a drive flight parallel to and laterally spaced from the guided track and a return flight spaced parallel to the drive flight;
   a drive motor for rotating the conveyor drive sprocket causing the drive flight to advance in a forward direction;
   a dolly assembly having an elongated dolly roller for engaging a tire of a vehicle located within the guided track, said dolly assembly being pivotally attached to the endless conveyor tensile member and shiftable about a generally vertical dolly pivot axis between an inactive position above the floor surface in which the dolly roller is pivoted rearwardly out of the guided track sufficiently to provide clearance for the vehicle and an active position in which the elongated dolly roller extends inwardly into the guided track to engage a vehicle tire, said dolly assembly provided with a follower portion spaced from said dolly pivot axis;
   an elongated dolly guide rail affixed parallel to the drive flight, said dolly guide rail having a first end located downstream of the idle sprocket and a second end located forward of the drive sprocket; said guide rail cooperating with the dolly follower to support the dolly assembly in the active position;
   an actuator for selectively shifting the dolly between the active and inactive positions on demand; and
   a track plate affixed to the base plate in the region of the guided track wherein said dolly rolls along the track plate when the dolly assembly is in the active position, and extends horizontally rearward above the base plate when the dolly assembly is in the inactive position, thereby providing clearance between the elongated dolly roller and the base plate to prevent dolly roller wear.

9. A conveyor for translating a wheeled vehicle having a plurality of tires across a floor with a pair of the vehicle's tires oriented in a guided track, the conveyor comprising:
- a conveyor drive sprocket and a conveyor idle sprocket each rotatably oriented relative to the floor surface in spaced apart relation;
- an endless conveyor tensile member extending in a loop about the conveyor drive and idle sprockets defining a drive flight parallel to and laterally spaced from the guided track and a return flight spaced parallel to the drive flight;
- a drive motor for rotating the conveyor drive sprocket causing the drive flight to advance in a forward direction;
- a dolly assembly having the elongated dolly roller for engaging a tire of a vehicle located within the guided track, said dolly assembly being pivotally attached to the endless conveyor tensile member and shiftable about a generally vertical dolly pivot axis between an inactive position above the floor surface in which the dolly roller is pivoted rearwardly out of the guided track sufficiently to provide clearance for the vehicle and an active position in which an elongated dolly roller extends inwardly into the guided track to engage a vehicle tire, said dolly assembly provided with a follower portion spaced from said dolly pivot axis;
- an elongated dolly guide rail affixed parallel to the drive flight, said dolly guide rail having a first end located downstream of the idle sprocket and a second end located forward of the drive sprocket; said guide rail cooperating with the dolly follower to support the dolly assembly in the active position; and
- an actuator for selectively shifting the dolly between the active and inactive positions on demand;
- wherein said dolly guide rail is oriented inboard of the drive flight a sufficient distance to enable the dolly roller in the inactive position to be oriented parallel to and between the drive flight and the guide rail, yet sufficiently close to the drive flight so that the dolly roller and the dolly follower is outboard of the guide rail when the dolly is in the active position.

10. A conveyor for translating a wheeled vehicle having a plurality of tires across a floor with a pair of the vehicle's tires oriented in guided track, the conveyor comprising:
- a conveyor drive sprocket and a conveyor idle sprocket each rotatably oriented relative to the floor surface in spaced apart relations;
- an endless conveyor tensile member extending in a loop about the conveyor drive and idle sprockets defining a drive flight parallel to and laterally spaced from the guided track and a return flight spaced parallel to the drive flight;
- a drive motor for rotating the conveyor drive sprocket causing the drive flight to advance in a forward direction;
- a dolly assembly having the elongated dolly roller for engaging a tire of a vehicle located within the guided track, said dolly assembly being pivotally attached to the endless conveyor tensile member and shiftable about a generally vertical dolly pivot axis between an inactive position above the floor surface in which the dolly roller is pivoted rearwardly out of the guided track sufficiently to provide clearance for the vehicle and an active position in which an elongated dolly roller extends inwardly into the guided track to engage a vehicle tire, said dolly assembly provided with a follower portion spaced from said dolly pivot axis;
- an elongated dolly guide rail affixed parallel to the drive flight, said dolly guide rail having a first end located downstream of the idle sprocket and a second end located forward of the drive sprocket; said guide rail cooperating with the dolly follower to support the dolly assembly in the active position; and
- an actuator for selectively shifting the dolly between the active and inactive positions on demand;
- wherein said dolly roller comprises an elongated body which is generally symmetrical about central axis, said body having formed therein a central bore sized to freely rotatably cooperate with a dolly axle shaft, said body having first and second ends and a region therebetween forming a large generally uniform diameter section for engaging the vehicle tire and a generally frusto-conical shaped section, said frusto-conical section having a large diameter end adjacent to and matching the diameter of the large diameter section and a small diameter end axially spaced therefrom, wherein said small diameter end is aligned in the direction of dolly travel when the dolly is in the inactive position thereby minimizing the likelihood of conveyor jamming.

11. A conveyor for translating a wheeled vehicle having a plurality of tires across a floor with a pair of the vehicle's tires oriented in a guided track, the conveyor comprising:
- a conveyor drive sprocket and a conveyor idle sprocket each rotatably oriented relative to the floor surface in spaced apart relation;
- an endless conveyor tensile member extending in a loop about the conveyor drive and idle sprockets defining a drive flight parallel to and laterally spaced from the guided track and a return flight spaced parallel to the drive flight;
- a frame including an open drive flight channel and an open return flight channel oriented in parallel spaced apart relation to the conveyor drive and return flights respectively;
- a drive motor for rotating the conveyor drive sprocket causing the conveyor drive flight to advance in a forward direction;
- a plurality of glide blocks affixed to the conveyor tensile member in spaced apart relation, said glide blocks slidingly cooperating with the drive and return flight channels and suspending the conveyor tensile member therebetween;
- a plurality of dolly assemblies affixed relative to the endless conveyor tensile member in spaced apart relation, each of said dolly assemblies having an elongated dolly roller for engaging a tire of a vehicle located within the guided track; and
- a glide block bracket affixed to the glide block and the chain for pivotably supporting a dolly assembly thereon;
- wherein said dolly assemblies are each attached to a glide block and pivotably shiftable between an inactive position in which the dolly roller is oriented out of the guided track; and sufficiently to provide clearance for the vehicle and an active position in which the elongated dolly roller extends into the guided track for engagement with the vehicle tire.

12. The conveyor of claim 11 further comprising an actuator for selectively shifting the dolly assemblies between the active and inactive positions on demand.

13. The conveyor of claim 11 wherein each of said plurality of glide blocks comprise an elongated body having a tapered forward end, a rearward end and a central region therebetween, said central region having a top, a bottom, and a pair of side walls, said elongated body sized to slidingly cooperate with the drive and return flight channels; said conveyor further comprising means for removably attaching one said brackets to said elongated body to transmit loads exerted by the conveyor tensile member and the dolly assemblies to said drive and return flight channels.

14. The conveyor of claim 13 wherein said glide block each are formed as symmetrical mirror images about a horizontal plane enabling the glide blocks to be inverted and reused when worn.

15. The conveyor of claim 11 wherein said glide blocks are each provided with a pair of spaced apart through holes, each of which have two counter bored ends to facilitate attachment of the glide block to the glide block bracket with said glide block bracket cooperating with the counter bored holes to facilitate the rotation of the glide blocks when worn while maintaining proper glide block bracket orientation.

16. A conveyor for translating a wheeled vehicle having a plurality of tires across a floor with a pair of the vehicle's tires oriented in a guided track, the conveyor comprising:
- a conveyor drive sprocket and a conveyor idle sprocket each rotatably oriented relative to the floor surface in spaced apart relation;
- an endless conveyor tensile member extending in a loop about the conveyor drive and idle sprockets defining a drive flight parallel to and laterally spaced from the guided track and a return flight spaced parallel to the drive flight;
- an elongated central frame affixed to the floor and extending between the conveyor drive and return flights;
- a drive motor for rotating the conveyor drive sprocket causing the drive flight to advance in a forward direction;
- a plurality of dolly assemblies affixed relative to the endless conveyor tensile member in spaced apart relation, each of said dolly assemblies having an elongated dolly roller for engaging a tire of a vehicle located within the guided track; and
- a plurality of drive flight cover panels, wherein each of said panels are pivotally attached to the frame and are shiftable between an operative position cantileveredly extending inwardly over the conveyor drive flight and a service position pivoted upwardly exposing the drive flight, each of said panels having an inward edge forming an elongated tire guide segment, said tire guide segments being generally coaxially aligned to define a boundary of said guided track.

17. The conveyor of claim 16 wherein said elongated tire guide segment comprises an elongated rod and a protractive plastic sleeve covering said rail to then minimize vehicle damage.

18. The conveyor of claim 17 further comprising a plurality of plastic tapered end plugs mounted in ends of each said elongated tire guide segments.

19. The conveyor of claim 16 wherein said plurality of drive flight cover panels are each provided with a region immediately outboard of the elongated tire guide segments which is inwardly, downwardly sloped to prevent a vehicle tire from riding upon the conveyor.

20. The conveyor of claim 16 wherein each of said dolly assemblies are pivotally attached to the endless conveyor tensile member and shiftable about a generally vertical dolly pivot axis between an inactive position above the floor surface in which the dolly roller is pivoted rearwardly out of the guided track to a position beneath the drive flight cover panels and an active position in which an elongated dolly roller extends inward of the elongated tire guide of the drive flight cover panels for engagement with a vehicle tire, said dolly assembly provided with a follower spaced from said dolly pivot axis; said conveyor further comprising said dolly guide rail fixed parallel to the drive flight, extending from a forwardmost position located downstream of the idle sprocket to a rearwardmost position forward of the drive sprocket, said dolly guide rail cooperating with the dolly arm follower to support the dolly assembly when in the active position; and
- an actuator for selectively shifting the dolly between an active and an inactive position on demand.

21. For use in a vehicle wash conveyor installed above a horizontal floor surface for translating a wheeled vehicle having a plurality of tires across the floor with a pair of the vehicle's tires oriented in a guided track and driven by one of a plurality of spaced apart dolly assemblies each of said dolly assemblies mounted to a bracket attached to an endless conveyor tensile member extending in an elongated loop adjacent to drive and return flight channels, and a plurality of spaced apart glide blocks each of said glide blocks comprising:
- an elongated body having a forward end, a rearward end and a central region of generally rectangular cross section therebetween, said central region having a top, a bottom, and a pair of side walls said elongated body sized to slidingly cooperate with the drive and return flight channels;
- a pair of longitudinally spaced apart vertical holes extending through said elongated body for removably attaching one of said brackets to said elongated body to transmit loads exerted by the conveyor tensile member and the dolly assemblies to said drive and return flight channels each of said holes having top and bottom counter bores; and
- a pair of tubular spacers sized to fit within said counter bores, said tubular spacers having an axial length greater than the depth of the counter bores to facilitate the insertion of a fastener through the holes in the elongated body and the tubular spacers to affix the elongated body to one of said brackets, thereby permitting the elongated body once worn to be turned over and reused with the spacing of the elongated body relative to the bracket determined by the tubular spacers.

22. The glide block of claim 21 wherein said elongated body is made of plastic.

23. The glide block of claim 21 wherein said elongated body is made of ultra high molecular weight polyethylene.

* * * * *